Oct. 18, 1966   C. P. ANDERSON ET AL   3,279,281
GENEVA DRIVE AND SELECTIVE MECHANISM
Filed Nov. 1, 1963   3 Sheets-Sheet 1

INVENTORS
CARL P. ANDERSON
JESSE J. SCHWEIHS
HILDING A. ANDERSON
BY
Strauch, Nolan & Neale
ATTORNEYS Oct. 18, 1966  C. P. ANDERSON ET AL  3,279,281
GENEVA DRIVE AND SELECTIVE MECHANISM
Filed Nov. 1, 1963  3 Sheets-Sheet 2

INVENTORS
Carl P. Anderson
Jesse J. Schweihs
Hilding A. Anderson
BY Strauch, Nolan & Neale
ATTORNEYS Oct. 18, 1966  C. P. ANDERSON ET AL  3,279,281
GENEVA DRIVE AND SELECTIVE MECHANISM
Filed Nov. 1, 1963  3 Sheets-Sheet 3

INVENTORS
CARL P. ANDERSON
JESSE J. SCHWEIHS
HILDING A. ANDERSON

BY Strauch, Nolan & Neale

ATTORNEYS

United States Patent Office 3,279,281
Patented Oct. 18, 1966

3,279,281
GENEVA DRIVE AND SELECTIVE MECHANISM
Carl P. Anderson, Homer, N.Y., Jesse J. Schweihs, Rochester, Minn., and Hilding A. Anderson, Lake Zurich, Ill., assignors to SCM Corporation, New York, N.Y., a corporation of New York
Filed Nov. 1, 1963, Ser. No. 320,891
20 Claims. (Cl. 74—820)

This invention relates to intermittent positive drive mechanisms and selective devices for controlling operation of the intermittent drive function. The mechanism uses a Geneva wheel form of incremental drive and includes components which enable operative relationship of the Geneva drive as well as determining which angular position of the input drive member will cause the output Geneva wheel mechanism to step. More particularly, the invention relates to mechanism for selectively advancing various machine components in stepped increments, e.g., step advancing of a teletypewriter carriage mechanism fed by a screw shaft or the step feeding of typewriter page record medium past the printing mechanism.

A well known basic mechanism for accomplishing rapid and smooth step advancement or drive of various machine components is the Geneva mechanism. The most common form of the Geneva mechanism includes a driven rotary member often referred to as a "star wheel" which has a plurality of slots (or grooves) which are usually but not necessarily radial and are successively engaged by an axially projecting pin secured eccentrically on a rotary driving member (or drive wheel). For each revolution of the driving wheel, the pin passes into and then out of one of the slots in the star wheel and rotates the star wheel a fixed increment of movement, thereafter the driving disc continuing its constant rotation or its rotation is terminated pending the desire or need for an additional step. Normally, there is a mechanical device on the driving member which interlocks with the periphery of the star wheel to prevent inadvertent rotation of the star wheel whenever the driving pin is not engaged in a star wheel slot. In addition to the above and most common Geneva mechanism, special constructions have been proposed, prior to the present invention, wherein the pin of the driving element or the entire driving element is fixed on an axially shiftable component enabling it to be shifted from an active position, e.g., see U.S. Patent Nos. 2,870,647 and 2,795,150. Another form of prior art Geneva mechanism which has been proposed previous to the present invention is constructed in a manner enabling the star wheel itself to be axially shifted in order to remove it from operational cooperation with the driving pin and thereby to disrupt the intermittent or step by step movement (see French Patent No. 903,991). The aforenoted selectively operative Geneva mechanisms are particularly related to devices for advancing and indexing mechanisms such as machine tools, camera devices, and telegraphic mechanisms, one step at a time.

In apparatus in which periodic or continual cylically occurring stepping motions at definite similar intervals are desired, there is no need for selective operation of the Geneva stepping action and conventional Geneva devices are well-suited.

The present invention however, applies to a type of stepping drive mechanism for use where indexing in most cases must accommodate an aperiodic actuation, being dependent upon some external control or demand condition. A particular application, in which intermittent stepping or indexing is desired at variable intervals, is in telegraphic or data communications recording apparatus, for which the present invention was developed. In such apparatus, the time period between the receipt of the signal and recording of the character may vary due to variation in internal selection time and therefore the stepping of the type carriage, hammer carriage or other mechanism being shifted across the record medium in accord with printing of character should vary to conserve time. Another aperiodic drive situation can arise during operation of many of the modern computing or data processing machines in which information retrieval is so rapid that it can be typed out a line-at-a-time and then the record medium is immediately shifted for recordation of the next line. The time interval necessary to start and finish the recording of each line, although extremely rapid, is often aperiodic. Similar situations can arise in very high speed page printers which, although not accomplishing line-at-a-time printing, nevertheless can type a line extremely rapidly with the record medium being shifted up for the next line twenty or more times per second depending upon how rapidly the line has been typed. Thus, a selectively operable Geneva mechanism can be utilized to provide carriage movement or paper feed stepping and would eliminate jar, rebound, and vibrational problems inherent in start-stop clutches and escapement stepping mechanisms now used.

The foregoing examples of Geneva drives in which aperiodic motion is accomplished by means of shifting either the driving component or the driven star wheel of the Geneva drive out of operative structural cooperation with one another are examples wherein aperiodic motion is accomplished while maintaining continuous rotation of the driving component. However, each of those devices require shifting of a rather massive major component and are distinctly limited to the basic feature of conventional Geneva wheels wherein the driving element must make at least one complete revolution for every stepping motion imparted to the driven element, both aspects contributing a limiting factor to maximum speed of operation.

Accordingly, a primary object of the present invention resides in the provision of a novel selectively operable intermittent Geneva form of drive mechanism particularly suitable for use where aperiodic transfer motion is desired.

A further object resides in the provision of a novel Geneva form of drive mechanism in which incremental drive force is enabled by selective control and reciprocation of a low mass pin, disposed in a continuously rotating drive member, into its driving position relative to a star wheel and also providing for return of the selected pin to its inactive position after the star wheel undergoes its incremental movement. It is also a further object to provide means to automatically invariably accomplish the afore-noted pin retraction before one complete revolution of the driving wheel has occurred.

A still further object of the present invention resides in the provision of a novel Geneva form of drive mechanism in which a rotatable driving member carries a plurality of driving pins mounted in a circular, spaced apart pattern for selective axial shifting between an active (or drive) and an inactive (retract) position and mechanism is provided to enable automatic selection and shifting of any driving pin into its drive position whereupon subsequent rotation of the driving member will result in an incremental driven movement of the star wheel with subsequent automatic retraction of the driving pin to a retract or inactive position. In conjunction with the foregoing object, a still further object resides in providing the novel multiple pin, selective Geneva mechanism with controls capable of transferring continuous rotary motion to a stepping motion, either peroidically or aperiodically as desired. It is a further object to enable selection and shift of a drive pin within the period required for the driving member to make 1/n rotation, where n equals the number of pins carried by the driving member.

A still further object resides in the provision of a novel electro-magnetically controlled, multiple pin selective Geneva mechanism capable of an aperiodic incremental drive output.

A further object resides in the provision of a novel Geneva mechanism capable of being selectively rendered operable incorporated in the drive train of a data communication page printer which accomplishes record medium line feed steps.

A still further object resides in the provision of a novel aperiodically selective Geneva mechanism in the drive train to a carriage feed screw shaft in a data communication printer of the type in which a part of the printing mechanism is supported by a carriage and there is relative travel between the record medium and portions of the printing mechanism accomplished in stepped or indexed movements during the recordation of a line of printed communication on the record medium.

Further novel features and objects of this invention will become apparent from the following detailed description and the appended claims taken in conjunction with the accompanying drawings showing preferred embodiments thereof, in which:

FIGURE 1 is a somewhat diagrammatic perspective drawing illustrating the basic components of a selective Geneva form of drive mechanism in accord with the present invention, and depicting such a selective drive mechanism as it can be used for operation of a feed screw by which a page printer carriage, e.g., carrying a print hammer, can be shifted in indexed steps laterally across a page record as the characters in a printed line of communication are recorded;

Figure 1:
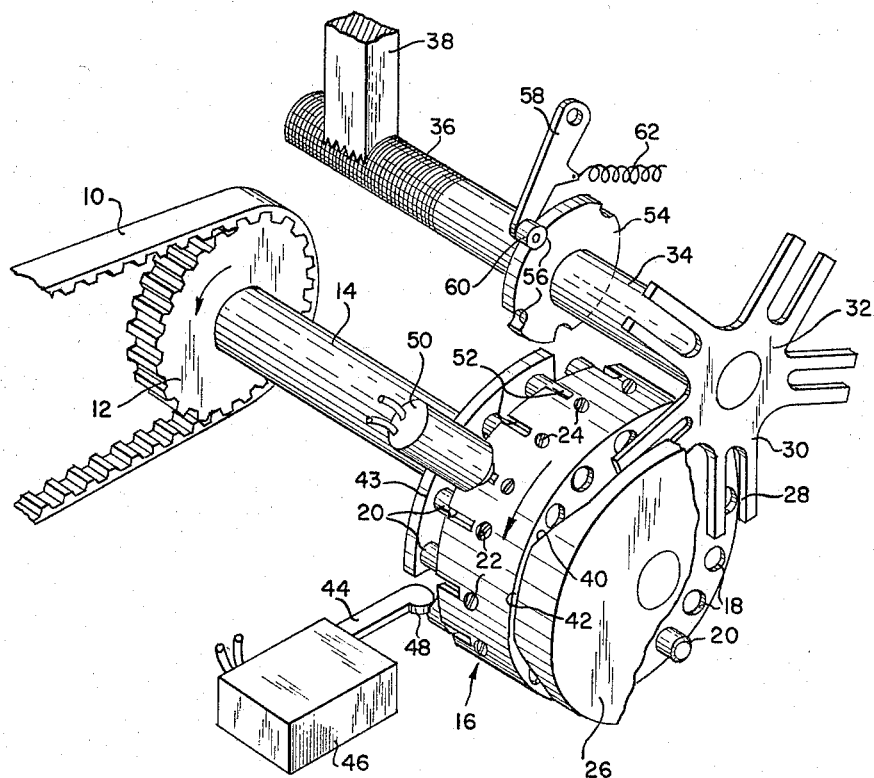
Figure 2:
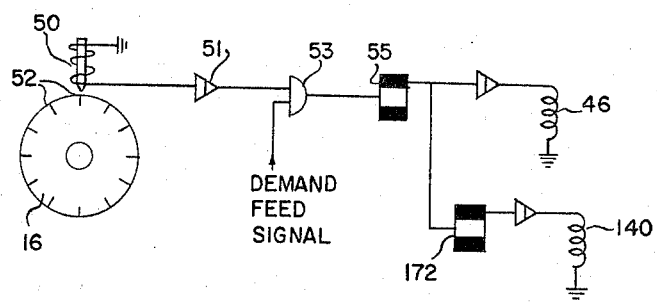
FIGURE 2 is a circuit schematic illustrating a simple control by which synchronized selective operation of the FIGURE 1 mechanism can be accomplished.

The mechanisms for accomplishing selective intermittent drive in both of the FIGURE 1 and FIGURE 2 embodiments are basically similar. Referring to the FIGURE 1 embodiment for a general understanding of the mechanism and its manner of operation, the drive consists of a continuously rotated pin cage (Geneva driving member) which houses a number of drive pins located in holes, the axes of which are parallel and spaced at equal distance around a circle near the outer periphery of the pin cage. All drive pins are slidably fitted into their associated holes for movement between two positions, which can be designated the "extended" and the "retracted" positions. A multi-armed Geneva follower or "star wheel" is positioned so one of its slots can be engaged by any selected and extended one of the pins, and then indexed an angular increment as the extended pin is rotated within its cage. An electronic sensing and control system uses a pick-up clock coil to sense and provide synchronized selection of a desired pin by activation of an electro-magnetic hammer device which can impact and shift the selected individual pin from its retracted to its extended position. A retract cam plate is non-rotatably secured to fixed structure and located on the star wheel side of the pin cage, being so disposed that when a selected extended pin rotates out of its engagement with the star wheel, the pin is immediately cammed back to its retract position. Although the incremental star wheel rotation undergoes a gradual acceleration and deceleration from and to zero following a sine curve and theoretically needs no positioning detent, it is desirable, as a practical matter and for a safety factor to assure accuracy of the limit positions of stepped output movements, to provide an indexing position detent on the output shaft.

In connection with the following specific description of FIGURE 1, it is to be understood that it is a somewhat diagrammatic view and that various machine components such as support framework, mounting plates or brackets, journal bearings, guide structure, etc., are not shown. Input drive power to the illustrated drive mechanism is derived from a rotary electric motor (not shown). The drive train from the motor includes an internally toothed, endless belt 10 which is in drive engagement with a toothed input gear 12 non-rotatably fixed on a shaft 14. The shaft is rotatably journalled and maintained against axial shift in support bearing (not shown) and non-rotatably fixed on the shaft 14 is a cylindrical pin cage 16, the driving or input member for a Geneva form of selective drive mechanism.

Pin cage 16 is preferably made from a single piece and arranged in a circular pattern near its periphery are a plurality of equiangularly spaced-apart through bores 18, the axes of which are parallel with the axis of rotation of the cage. A driving pin 20, preferably made from steel, is placed, with a free sliding close fit into each of bores 18. Pins 20 are longer than the length of the through bores 18 in cage 16 and have two limit positions, either retracted or extended. To assure that a pin 20 remains in one or the other of its two limit positions until positively shifted to the other position, a spring pressed ball detent (not shown) is provided for each drive pin, the spring and ball being placed in radial passageways 22 normal to and intersecting with each pin bore 18, after the pin 20 is inserted. The passageways are then closed with a screw plug 24. Each pin 20 has two circumscribing grooves which alternately cooperate with its associated spring pressed ball to provide detent action at each pin position. A somewhat similar and preferred form of pin detent can be seen in the pin cage for the sceond embodiment shown in FIGURE 6. The primary difference between the two examples of pin detents being that centrifugal force acts against detent action in the FIGURE 1 construction while it aids detent action in the FIGURE 6 construction.

FIGURE 1 depicts all but one of the pins 20 in normal or retract position, where their excess length projects from the rear face of pin cage 16. If a pin is forced from retract position to selected drive position, it is shifted axially through the cage 16 until its opposite end projects from the front face of the cage. One such selected and extended pin 20 can be seen in the lower right hand corner of FIGURE 1. A stationary cam plate 26, a portion of which is broken away for illustration, overlaps the front face of the cage 16, being secured to fixed support structure by means not shown. Throughout most of the rotational path of pins 20, the cam face of cam plate 26 is axially spaced a short distance from the front face of the cage and serves as a position limiting stop plate whenever a pin 20 is selected and forced to its extended position.

Bearing in mind that FIGURE 1 illustrates mechanism wherein rotation of the cage 16 is continuous and counterclockwise, when a pin 20 has been selected and shifted to extended or drive position, its projected portion will rotate into a slot 28 in an arm 30 of star wheel 32, the arm, when at rest, being disposed with its slot 28 substantially tangential to the path of rotation of and with its open end disposed to receive any oncoming selected drive pin 20. As the pin passes into the star wheel slot 30 and continues to move in its rotational path, it causes the star wheel 32 to start moving slowly, then faster and then slower. As the star wheel slows to a stop, the pin passes out of the open end of the slot which now is again tangential to the path of the pins at the location of the departing pin. The following star wheel arm 30 is now positioned at rest to receive the next selected and extended drive pin 20.

Star wheel 32 is non-rotatably fixed to an output shaft 34 which in turn is rotatably journalled and axially positioned in suitable bearings (not shown). Shaft 34, includes screw threads 36 which are in threaded engagement with a matched threaded follower 38 depicted schematically and for purposes of this description can be considered to be a carriage for shifting printing means across a record medium. The follower is preferably a releasable. The follower is preferably a releasable type of thread follower although it may be a complete nut or a threaded through bore in a carriage, e.g., a print hammer carriage. The FIGURE 1 embodiment is of particular utility for stepping a print hammer carriage across a record page upon incremental angular rotations of the screw shaft 34. An example of a screw type feed shaft feeding a print carriage through a non-releasable unit may be seen in the Yost U.S. Patent No. 2,774,816. Copending U.S. application Serial No. 278,241, filed May 6, 1963 and owned by applicants' assignee, illustrates a carriage screw feed with a releasable connection between screw and carriage. Both the screw shaft 34 and the follower 38 can be considered as data processing machine step operated components.

Returning to the description of a selected extended feed pin 20, after the pin rotates out of engagement with the slotted arm 30 of the star wheel 32, it continues to move along its rotary path under continuous drive by the rotating cage 16 and its projected end will be forced into engagement with an inclined face 40 leading to cam rise 42 of cam 26. Coaction with the cam rise forces the extended pin 20 to override its detent and undergo an axial shift back to the retract position where its other end projects from the rear face of the cage 16 and abuts against a position limiting arcuate stop plate 43. Plate 43 is only needed adjacent a sector of cage rotation where the cam rise 42 causes retract positioning of a selected pin 20 and is terminated just ahead of the pin selection station.

Selection of any pin 20 is accomplished by a selecting hammer 44, actually the pivoted armature on a miniature high strength electro-magnet 46. The impact head 48 of hammer lever 44 is disposed immediately to the rear of the path of rotation of all pins 20 so that upon energization of the electro-magnet 46, the armature lever 44 will be pulled froward and its head will impact the end of the pin 20 which at that instant has rotated into the selection station.

To determine the appropriate time for energizing the electro-magnet 46 when a feed step or increment of intermittent drive output is desired so that the hammer 44 will squarely impact the end face of the next pin 20, an electronic clock and synchronized control circuit may be used. A pick-up coil reading head 50 is located adjacent the cylindrical periphery of pin cage 16, in which are cut a plurality of equally spaced apart clock notches 52 corresponding to the number of drive pins carried by the cage. Each time a pin 20 approaches the selection station, a corresponding notch 52 will induce a current impulse in the coil of the pick-up head 50. By means of an appropriate control circuit to solenoid 46, such as the electronic circuit depicted in FIGURE 2, the clock impulse corresponding to an approaching pin can be amplified by amplifier 51 and directed to one of the inputs of an "and" gate 53 and, if selection is demanded, will be gated to a hammer solenoid one shot 55 by a feed signal applied to the second input to "and" gate 53. One shot 55 immediately energizes the selection solenoid 46 and causes hammer 44 to impact the next pin 20 and force it to its selected extended position for step driving the star wheel 32.

The star wheel or Geneva follower 32 has five arms, hence the thread lead of the screw shaft threads 36 will be equal to five print character spaces so that each increment of rotation or stepped movement of the star wheel 32 will shift the carriage by means of the engaged screw follower 38, a distance of one character space. To assure precise incremental 72° rotation of the screw 36 during each indexing step, a follower detent arrangement is provided and includes a notched disc 54 non-rotatably secured on the screw shaft. Disc 54 has 5 detent notches 56 equi-angularly spaced around its outer peripheral edge, the notches corresponding to the five arms of the star wheel 32. A pivoted lever 58 carrying a detent roller 60 at its free end is positioned and biased by a coil spring 62 so the roller engages the periphery of detent disc 54 and is biased into detaining cooperation with successive notches 56 as the shaft 34 and attached disc 54 are indexed by the selective intermittent drive.

Description of the second embodiment is with reference to FIGURES 3, 4, 5 and 6 wherein the selective Geneva feed mechanism is shown as it may be applied to accomplish line feed of a page record in a drum printer. An appropriate drum printer record feed mechanism is described and claimed in copending application Serial No. 184,820, filed April 3, 1962, and owned by the assignee of the present application, to which reference may be had as may be necessary. The Geneva form of intermittent feed mechanism with selective control of its output, as disclosed in FIGURES 3–6, is illustrated with more accurate structural details, relative sizes and operative association of the assembly components and the manner in which they would be mounted on actual machine framework than is depicted in FIGURE 1, being in fact derived from scaled engineering drawings.

Figure 6:
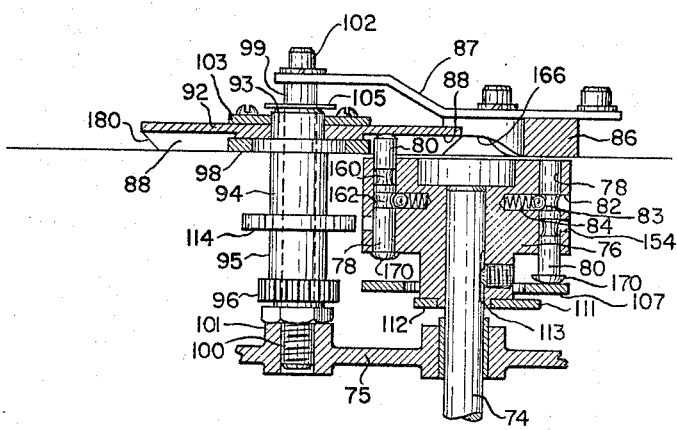
FIGURE 6 is a section view taken on line 6—6 of FIGURE 3 and illustrates some internal details of the driving disc with its plurality of shiftable drive pins, the retract cam and the retract position stop plate.

The major components of the selective intermittent drive assembly in the second embodiment are similar to but have more refined components than the first embodiment. The assembly, best understood with reference to FIGURES 3 and 6, includes an input drive shaft 74 which will be in continuous rotation under the power of an electric motor (not shown). Drive shaft 74 is journalled in the machine framework, a portion 75 being one of the main side plates of a drum printer. Non-rotatably secured to one end of power input shaft 74 is the drive pin cage 76 including axially disposed bores 78 which receive the axially shiftable drive pins 80. Pins 80 are best shown in FIGURE 6 as are the radial passageways 82 associated with each bore 78 for receiving the small balls 83 and coil springs 84 constituting drive pin position limit detents. The drive pin retracting cam plate 86 is rigidly fastened, adjacent the outside face of the drive pin cage 76, on a cam plate bracket 87 which in turn is secured by screws to the drum printer side plate 75. Any selected pin 80 which rotates with the pin cage 76 will enter a radial drive groove 88 located on a "star" wheel 92, the star wheel having a plurality of such drive grooves 88, six of which are used in the instant embodiment, rather than slotted arms as in the first embodiment. For convenience the Geneva follower will be termed a star wheel whether or not it has arms as in a star and for generic meaning the terms slots and grooves are analogous.

The star wheel 92 is non-rotatably fixed, as by a small key 93, to the output or driven shaft 94. Shaft 94 can be made as an integral piece or it can be fabricated and assembled from several components. In either case it incorporates a sleeve 95, a spur gear 96 non-rotatably fixed on the sleeve 95 and a star wheel mounting flange 98 adjacent one end. Sleeve shaft 94 is journalled for rotation by suitable bearings (not shown) on an axle shaft 99, one end 100 being threaded and serving to secure the axle in a threaded mounting boss 101 on side plate 75. The end of axle 99 has a piloting projection 102 which projects beyond the end of star wheel shaft 94 and spigots into a hole in the cam bracket 87 for additional support. The star wheel 92 is keyed to sleeve shaft 94 and maintained against the shaft flange 98 by means of a clamp plate 103 and clip ring 105. Shaft 94 is thus rotatably journalled and axially positioned on the machine side plate 75 by means of axle 99, with its axis parallel to and adjacent the cylindrical periphery of the drive pin cage 76, a portion of the star wheel 92 overhanging the end face of pin cage 76.

Also, non-rotatable, and preferably integral, with the star wheel sleeve shaft 94 is a detent disc 114 which, in its periphery includes a plurality of detent notches 116 equal in number to the drive grooves 88 located in the side face of the star wheel.

Figure 3:
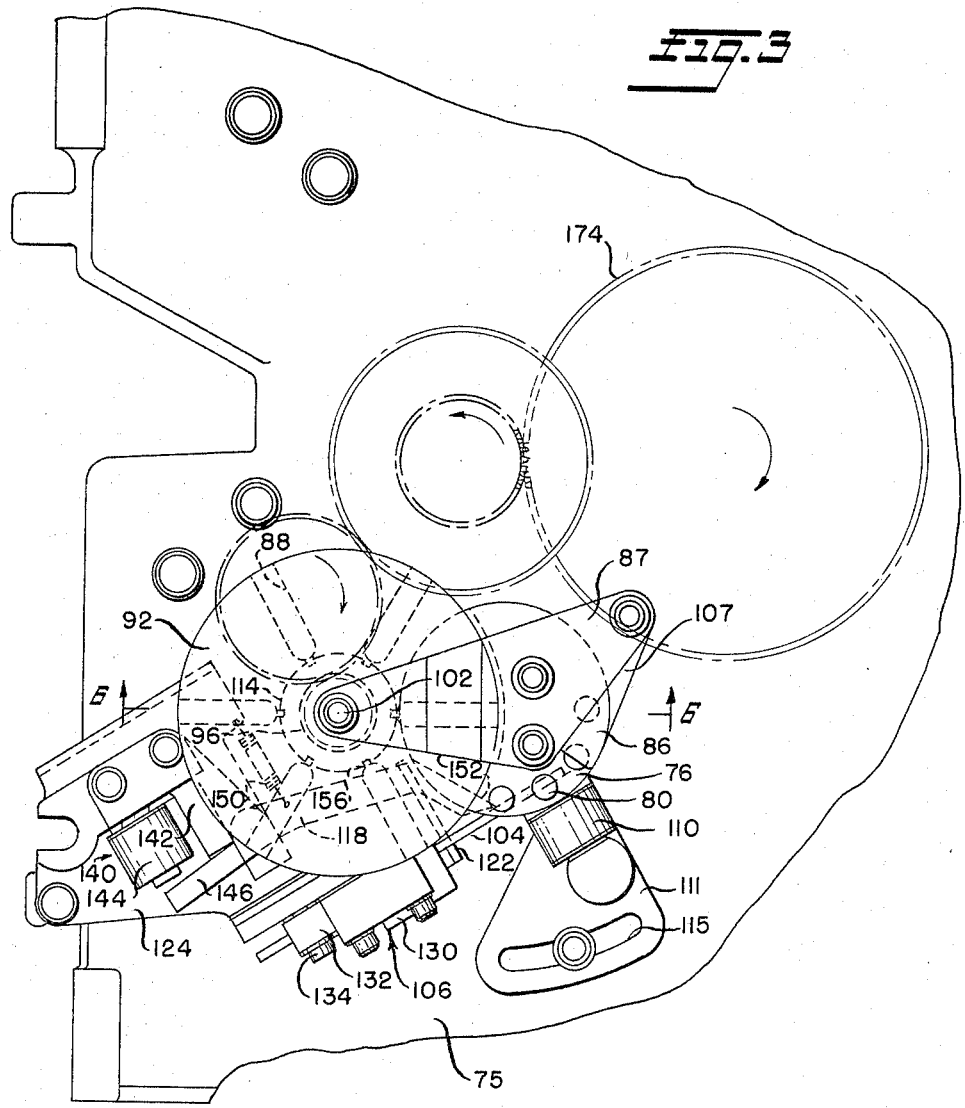
FIGURE 3 is a left-hand side elevation illustrating a second and more sophisticated embodiment of selective Geneva mechanism in accord with the present invention and incorporated in the drive train for drive indexing the line feed components for the record page of a drum printer.
Figure 4:
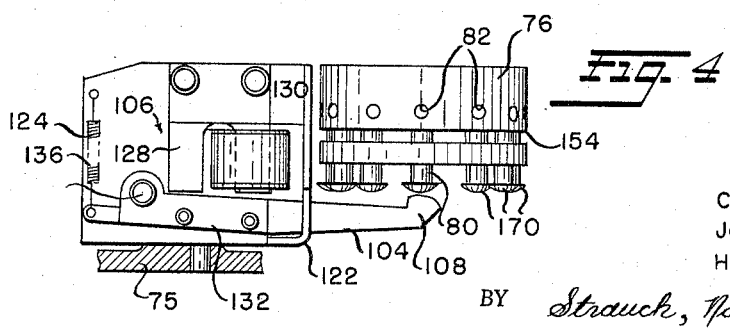
FIGURE 4 is a detail plan view showing the electro-magnetic operator as viewed from below FIGURE 3.

The second embodiment includes a retract limit position stop plate 107 similar to stop plate 43 shown in FIGURE 1 and, as shown in FIGURES 3 and 4, includes a drive pin selecting hammer lever 104 and its operator, an electro-magnet 106. The free end 108 of hammer lever is contoured as a hammer head adapted to coact with and impact a drive pin head to cause the impacted pin to shift to an extended position.

To sense and determine the rotation position of the drive pins carried by the pin cage, the second embodiment also utilizes an induction pick-up head 110 fixed on a bracket 111 which in turn is adjustably mounted to the drum printer side plate 75 as shown in FIGURE 3. One end 112 of bracket 111 is coaxially maintained on a boss 113 formed on the rear face of the pin cage 76. The other end of the sensing head bracket 111 is arcuately slotted at 115, the slot being coaxial with the pin cage axis of rotation, and a clamping screw passes through the slot 115 and is threaded into the printer side plate 75. Adjustment of bracket 112 enables the pick-up head 110 to be shifted arcuately about the cylindrical periphery of the pin cage 76 for timing of the pick-up impulses with pin rotational position. The pick-up core of head 110 is radially located so that it is directly aligned with the plurality of ball detent passageways 82 radially situated in a radially planar sense normal to the axis of the pin cage 76. The open ends of passageways 82 constitute clock notches and, during rotation past the core end face of pick-up head 110, induce current impulses in the pick-up head coil 110. Such current pulses can be utilized in a control circuit, similar to FIGURE 2, to control energizing of the pin selection electro-magnet operator in a manner similar to that described with respect to the FIGURE 1 embodiment.

Figure 5:
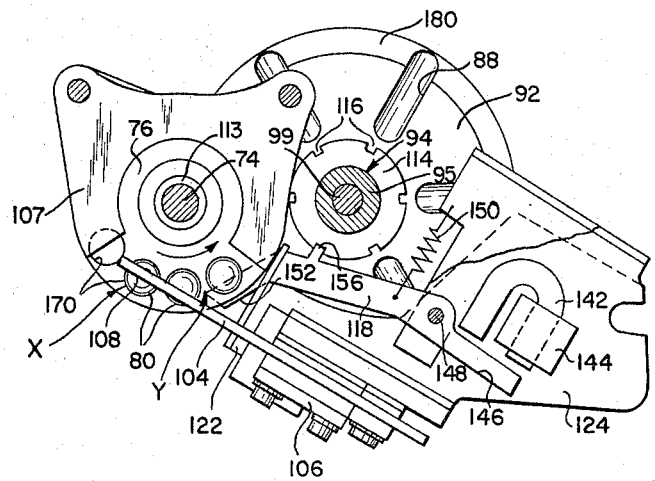
FIGURE 5 is a right-hand side elevation view of the Geneva feed mechanism shown in FIGURE 3, this view showing only the Geneva feed components.

Some structural differences in the components and their cooperating structure are apparent in the figures for the second embodiment, although they are not distinctly apparent from the FIGURE 1 disclosure. Seen in FIGURES 3, 4, and 5 is a bent plate bracket 122 which can be fastened by screws to the hammer operator bracket plate 124 and extends into intersection with the hammer lever 104 and with a lock lever 118 which is used in lieu of the shaft detent lever 58 in FIGURE 1. Not shown, but clearly apparent from these views, the plate 122 includes several slots which respectively embrace hammer lever 104 and the lock lever 118, and serve in the manner of a guide comb, to maintain and guide those two levers in their pivotal rocking movements of operation. The electro-magnet 106 which is used to shift the pin selector hammer 104 is an extremely high speed miniature operator having its U-shaped core 128 made from laminated wound ribbon stock, and with one leg of the core 128 carrying the small compact energizing coil 130. The hammer lever 104 is rigidly secured to the electro-magnet armature 132 which in turn is pivotally mounted on a post 134 secured on the magnet assembly bracketed 124. The armature 132 is biased to its inoperative position, shown in FIGURE 4, by a suitable biasing spring 136.

In lieu of the star wheel shaft detent assembly used in the FIGURE 1 embodiment the second embodiment has a latch device for positively locking the star wheel shaft indexing position, the latching device being unlatched by means of an electro-magnet 140, also a miniature high speed electro-magnet similar to the hammer operator electro-magnet 106, with a ribbon wound core 142 and an operating coil 144. The armature 146 of the latch operator electro-magnet 140 is pivoted on a post 148, also secured on the magnet assembly mounting bracket 124, and is rigidly secured to the latching lever 118, most clearly shown in FIGURE 5. The de-energized position of the combination armature 146 and latching lever 118 is the latched condition, the lever 118 being urged toward that position by means of a biasing coil spring 150. As has been described, the latching lever 118 is guided in a slot in the comb plate 122 and its free extremity is formed as a cam follower tab 152 which under force of biasing spring 150 is urged into a circumferential groove 154 located around the circumference of the pin cage 76. The purpose of this cooperation will be explained hereinafter in detail. At an intermediate location on latching lever 118, and radially aligned with the notched star wheel shaft latching disc 114, is a projecting latch lug 156. When the latch operator electro-magnet 140 is de-energized, latch lever 118 is urged toward a latching cooperation with latch disc 114 by the biasing spring 150 and the latch lug 156 may move into an aligned one of the latching disc notches 116, to thereby securely lock the indexed position of the star wheel output shaft 94, against any tendency of the output drive components to change position due to inertia, jarring or vibration.

Turning to FIGURE 6, it will be seen that the drive pins 80, which are slidably disposed in the bores 78, include two adjacent curved bottom grooves 160 and 162 enabling cooperation with the associated spring loaded detent ball 83 in either of the two positions of the drive pin. The pin shown at the left side of the cage in FIGURE 6 is in its extended or drive position, i.e., it has been impacted by the head 108 of the hammer lever 104 and has been passed by rotation of the cage approximately half way through the intermittent drive portion of its drive cycle, being shown near the bottom of the driving groove 88 in star wheel 92. As the rotation of pin cage 76 continues, the selected pin at the left will pass out of cooperation with the driving groove and rotate along its path into contact with an inclined side face portion 166 of the retract cam 86. Continued rotation of the pin cage 76 will force the selected pin back to the retracted position overcoming the detent force of ball 83 which then snaps into the other pin groove 160, detaining the pin 80 in its retracted position. This retract action occurs at a very high speed and therefore the stop pin 80 as it is cammed to the retract position has an inertia force which is absorbed by engagement of the pin head 170 against stop plate 103. As the pin head 170 engages the stop plate 103, the detent ball 83 will seat in the pin groove 160 and is under sufficient biasing force to prevent any rebound action of the pin tending to shift it again to the selected position. The pin thus remains in its retract position as the stop pin cage continues its rotation.

Note, in the retract position of a pin 80 the extend position detent groove 162 in the pin shank will be positioned in radial alignment with the aforenoted circumferential groove 154. The effect of all of the grooves 162, when all pins 80 are in retract position, being aligned with the circumferential cage groove 154 is to make that circumferential groove 154, effectively, a deeper groove. If any pin is then shifted to an extended position (see the left hand pin), the full diameter body of the pin shank is disposed across the groove 154 to create a camming obstruction where that pin intersects the groove.

Turning now to FIGURE 5 and with the understanding that the pin cage 76, as therein viewed, is rotating counterclockwise, when a pin reaches point X it is in position where it can be selected by impact of the head 108 of hammer 104, should the hammer operator electro-magnet 106 be energized at that instant. Assuming that a pin has been selected at point X, it then passes, during rotation of the pin cage, into engagement with one of the drive grooves 88 of star wheel 92, entering the outer end of the groove 88 approximately at point Y. As hereinbefore described, the follower tab end 152 of the latching lever 118 rides in the circumferential groove 154 of the pin cage and, in the event that latching lever 118 has not been positively operated to its unlatched condition at the time a selected pin reaches point Y, a full body portion of the shank of the selected pin 80, having been shifted into intersection across the circumferential groove 154, will engage the edge of the follower tab 152 and positively cam the latching lever 118 out of its latching engagement with the latched disc 114 at the precise moment the drive end of the selected pin 80 enters the star wheel drive groove 88. This is a safety feature which assures that a selected and extended drive pin can drive the star wheel an index step without destroying the latching lug 156 if it remains inadvertently disposed in latched engagement with one of the latch disc notches 116. Under normal operation the latching lever electromagnet operator 140 will be energized simultaneously or in conjunction with energization of the pin selector magnet 106 and therefore the latch lever 118 should be in an unlatched condition at the time a selected and extended drive pin enters a star wheel driving groove. The circuit to energize the latch lever electro-magnet 140 can include a timed one-shot 172 (shown in FIGURE 2), triggered by operation of the selector magnet one-shot 55, and of sufficient duration to assure that the follower shaft 94 has started its incremental rotation before the latch magnet is de-energized. However, even if premature de-energization of the latch operator magnet 140 results in the latching lever 118 starting to move back to latched condition, it will be prevented from doing so because of engagement by its follower tab 152 against the full bodied shank of a selected pin 80.

FIGURE 6 illustrates the peripheral edge 180 of the grooved face of star wheel 92 as bevelled. That feature will automatically cause camming of an extended position pin to a retract position should the star wheel ever be inadvertently placed in a non-indexed rest position, at the time a selected extended pin is being rotated into intersection with the star wheel.

FIGURE 3 includes a gear train which is driven by the star wheel shaft gear 96. The end gear 174 of that gear train is a ring gear secured to a record sheet feed wheel journalled adjacent the end of the drum of a drum page printer such as depicted in the aforenoted application Serial No. 184,820. By means of appropriate gear ratios in the gear train from star wheel gear 96 to the feed wheel gear 174, each indexing step of the star wheel 92 will rotate the feed wheel an angular increment equivalent to the required spacing between lines on the page record of the page printer. Any unit of the gear train between the star wheel shaft gear 96 and the record feed wheel ring gear 174 is a step operated component.

The power and control circuitry illustrated in the aforenoted application Serial No. 184,820, can be utilized to provide a line feed demand signal to cause energizing of both the selector and unlatching solenoids of the herein described second embodiment. However, the feed signal circuit in the present case does not require the high power transistors necessary to directly operate the solenoid operated pawl driven page feed assembly as are depicted in the specific circuitry in the aforenoted application.

Even though the present invention utilizes well known principles of Geneva wheel intermittent drive mechanisms, it has several important aspects which have never before been contemplated or utilized. It uses a multiplicity of driving pins disposed peripherally around a driving wheel cage with each pin capable of being shifted between a retract and selected drive position by means of a selectively actuated electro-magnet operator. Any pin which is selected and shifted to its drive position will, by virtue of continual rotation of the pin cage, pass through a predetermined arcuate distance during which time the selected pin will cooperate with a slot or groove of a Geneva follower wheel to index the output in a stepped increment of drive movement. Immediately after leaving cooperation with the Geneva follower, the pin which is in its selected drive position will be rapidly shifted to its second or retract position. Unless one of the multiplicity of driving pins is selected and shifted to its driving position, the output follower of the Geneva mechanism cannot be stepped. Accordingly, it will be understood that by selective control of the extended position of the various driving pins, which can be determined by input signals to the electro-magnetic operator, the output stepping drive movement of the Geneva mechanism may be made to occur either periodically or aperiodically. Thus, it is possible to obtain an extreme variation in a rate of intermittent output drive per unit time without requiring any variation in the rotational speed of the driving input component of the Geneva mechanism.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A Geneva wheel intermittent drive mechanism, comprising: a rotatable Geneva wheel input means; a Geneva follower output means; said input means including a plurality of selectively operable drive transfer devices arranged in a spaced-apart annular group around the axis of rotation of said input means and any one of which, when selectively operated, will impart an incremental drive step to said follower output means during rotation of said input means; and means to selectively operate any one of said drive transfer devices to accomplish an increment of output drive.

2. A Geneva wheel intermittent drive mechanism as defined in claim 1, wherein said means to selectively operate said drive transfer devices comprises synchronizing means responsive to an external signal and to the position of each drive transfer device as its rotational path coincides with a predetermined angular position for selectively operating a drive transfer device, to enable it to accomplish an increment of output drive, within $1/n$ rotation of said input means after receiving said external signal, where $n$ equals the number of said plurality of drive transfer devices.

3. A Geneva type of intermittent motion transmission mechanism comprising: a Geneva wheel follower; a rotatable Geneva driving means including a plurality of two-position shiftable driving devices any one of which when shifted to one of its two positions during rotation can engage and drive said follower a predetermined increment of full rotation; means for selecting and shifting any of said plurality of driving devices to said one position; and means to engage a selected and shifted driving device during its rotation and to shift it back to the other of said two positions.

4. A selectively engageable intermittent motion Geneva transmission mechanism comprising: a rotatable driven member having means thereon enabling an intermittent drive engagement by a drive pin device rotating about an axis eccentric to the axis of rotation of said driven member; a rotatable driving means including a rotary cage and at least one shiftable drive pin device mounted in said cage for shifting movement between an extended intermittent drive position whereat said pin device will engage and impart rotary drive force to said driven member for an increment of full rotation during a predetermined increment of rotation of said cage, and a retracted position whereat said pin device will not engage and thus will be incapable of engaging and imparting any driving force to said driven member during rotation of said cage; selectively operable operator means to select and shift said pin device from its retracted position to extended intermittent drive position; and means independent of said operator means operable to engage and force said extended pin device to its retracted position during an angular increment of rotation of said cage exclusive of said predetermined increment of rotation of said cage.

5. An intermittent motion transmission mechanism as defined in claim 6, wherein said driven rotary member is a Geneva star wheel follower having a plurality of radial drive tracks defined therein.

6. A selectively engageable intermittent motion transmission mechanism comprising: a rotatable driven member having means thereon enabling an intermittent driven engagement by a drive pin device rotating about an axis eccentric to the axis of rotation of said driven member; a rotatable driving means including a rotary cage and at least one shiftable drive pin device mounted in said cage for shifting movement between an extended intermittent drive position whereat said pin device will engage and impart rotary drive force to said driven member for an increment of full rotation during a predetermined increment of rotation of said cage, and a retracted position whereat said pin device will not engage and thus will be incapable of engaging and imparting any driving force to said driven member during rotation of said cage; selectively operable operator means comprising an electro-magnet with pivotal armature means including a hammer lever with an impact end disposed adjacent the path of rotation of said pin device so that, upon energization of said electro-magnet, said hammer impact end will impact said pin device and drive it from its retracted position to extended intermittent drive position; and means independent of said operator means operable to engage and force said extended pin device to its retracted position during an angular increment of rotation of said cage exclusive of said predetermined increment of rotation of said cage.

7. An intermittent motion transmission mechanism as defined in claim 6, wherein said operator means includes a control circuit provided with angular pin device position detection means enabling synchronization between the rotational position of said pin device and selective operation of said operator means.

8. An intermittent motion transmission mechanism as defined in claim 6, wherein said retracting means independent of said operator means comprises a fixed cam device invariably engaged by an extended drive pin device during its rotational travel through an angular increment of rotation following disengagement of said drive pin device from said driven member and prior to reengagement of said drive pin device with said driven member, said cam plate being shaped to enable the rotational travel of said drive pin device to cam said drive pin device from its extended position back to the retracted position.

9. An intermittent motion transmission mechanism as defined in claim 6, wherein indexing means are provided in structural cooperation with said driven member for maintaining a predetermined non-rotational indexed condition of said driven member at all times except when said drive pin device is in engagement with said driven member.

10. A selectively engageable intermittent motion transmission mechanism comprising: a rotatable driven member having means thereon enabling an intermittent drive engagement by a drive pin device rotating about an axis eccentric to the axis of rotation of said driven member; a rotatable driving means including a rotary cage and at least one shiftable drive pin device mounted in said cage for shifting movement between an extended intermittent drive position whereat said pin device will engage and impart rotary drive force to said driven member for an increment of full rotation during a predetermined increment of rotation of said cage, and a retracted position whereat said pin device will not engage and thus will be incapable of engaging and imparting any driving force to said driven member during rotation of said cage; selectively operable operator means to select and shift said pin device from its retracted position to extended intermittent drive position; means independent of said operator means operable to engage and force said extended pin device device to its retracted position during an angular increment of rotation of said cage exclusive of said predetermined increment of rotation of said cage; and indexing means provided in structural cooperation with said driven member for maintaining a predetermined non-rotational indexed condition of said driven member at all times except when said drive pin device is in engagement with said driven member; said indexing means comprising: an electro-magnetically operated latch means including an electro-magnet with armature means, a first latching portion on said armature means and a second latching portion secured on said driven member in a direct rotational and angular correlation to said drive pin device, said two latching portions being adapted to interlock and prevent rotation of said driven member when said latching electro-magnet is de-energized; and means for momentarily energizing said latching electro-magnet whenever said operator means is rendered operative to engage and shift said pin device to a selected position.

11. An intermittent motion transmission mechanism as defined in claim 10, wherein means on said latching electro-magnet armature means and on said drive pin device are adapted, during a predetermined period occurring from the point of selection of said pin device to initiation of rotation of said driven member by said pin device, to mechanically prohibit interlocked cooperation between said two latching portions.

12. An intermittent motion transmission mechanism as defined in claim 11, wherein said driven member has a plurality of indexed incremental rotation positions, a plurality of said drive pin devices are mounted in said cage in an annular spaced-apart arrangement about the axis of said cage and a plurality of said second latching portions are provided, each of which is fixed in a direct rotational and angular correlation to an associated one of said driven member indexed positions and, in each of said indexed positions, said first latching portion interlocks with a different one of second latching portions.

13. A selectively engageable Geneva wheel drive mechanism comprising: a plural track Geneva follower wheel; a drive means for said Geneva follower wheel comprising a rotatable drive pin cage, a plurality of spaced apart drive pin receiving through bores parallel to and disposed in a circular arrangement around the axis of rotation of said pin cage, a plurality of drive pins each of which is slidably disposed in an associated bore of said pin cage and is shiftable between a first, extended position enabling operative Geneva stepping engagement with said Geneva follower wheel and a second, retracted position precluding engagement with said Geneva follower wheel; selectively actuatable operator means adapted to engage and shift any one of said pins to said first position; retract means adapted to engage any pin disposed in said first position and shift it to said second position during an increment of rotation of said pin cage following disengagement of the extended pin from said Geneva wheel and prior to reengagement of the extended pin with said Geneva wheel.

14. A Geneva wheel drive mechanism as defined in claim 13, wherein said means for retracting an extended pin is invariably automatically operable following a single Geneva wheel stepping movement subsequent to selection and shifting of a pin to said first position.

15. A Geneva wheel drive mechanism as defined in claim 13, wherein said operator means includes control means responsive to a random selection in combination with the rotational movement of a said pin in said rotatable pin cage past a selection control station for enabling said operator means to be actuated and to accomplish synchronized selection of a pin, while said pin is moving in a rotary path.

16. A Geneva wheel drive mechanism as defined in claim 15, wherein said operator means includes: an electro-magnetically operated means capable, when momentarily energized, of selecting and shifting of a pin from retracted position to extended position during continual rotation of said pin cage; and said control means include electronic circuitry comprising a selection circuit connected to said electro-magnetic means and a pin cage rotary electronic clock device with associated gating circuit providing an impulse corresponding to each pin in said cage to control gating of said selection signal circuit, only when a said pin has rotated to said selection control station for permitting energizing of said electromagnetic means by a selection signal placed on said selection circuit.

17. A Geneva wheel drive mechanism as defined in claim 16, wherein said clock device includes an induction coil reading head disposed closely adjacent the outer peripheral surface of said pin cage and said pin cage peripheral surface has a plurality of abrupt discontinuities directly corresponding in angular relationship to the angular relationship of said pins.

18. A Geneva wheel drive mechanism as defined in claim 17, wherein individual passage means from the exterior peripheral surface are provided for and intersect each pin receiving bore; a pin position detent device is included and maintained in each passage; and the exterior openings of said passage means constitute said abrupt discontinuities.

19. For use in combination with data processing machines, an indexing drive mechanism for accomplishing an intermittent drive operation of such machine comprising: a data processing machine step operated component; a rotatable, Geneva transmission input means; a Geneva follower output means; a rotary drive train connecting said output means to said machine component; said input means including a plurality of selectively operable drive transfer devices arranged in a spaced-apart annular group around the axis of rotation of said input means and any one of which, when selectively operated, will impart an incremental drive step to said follower output means; means to selectively operate any one of said drive transfer devices to accomplish an increment of output drive; and means to impart drive rotation to said input means.

20. An indexing drive mechanism as defined in claim 19, wherein: said component is a carriage for shifting printing means across a record medium; said rotary drive train including a cooperating screw shaft and threaded follower device, said screw shaft being connected to and rotated by said Geneva follower and said follower device being secured on said carriage; said Geneva transmission input means includes a rotatable power driven pin cage having at least three drive pin carrying through bores annularly arranged in equally spaced apart disposition around and with their axes parallel to the axis of rotation of said pin cage; and at least three of said drive transfer devices, each of which is a Geneva drive pin slidably disposed in an associated through bore of said pin cage for selective operation between an extended drive transmitting position and a retracted position inoperative to transmit drive.

References Cited by the Examiner

UNITED STATES PATENTS

| | | | |
|---|---|---|---|
| 1,988,675 | 1/1935 | Tessky | 74—820 |
| 2,535,490 | 12/1950 | Emerick | 74—820 |
| 2,909,626 | 10/1959 | Enssle | 200—38 |

OTHER REFERENCES

Product Engineering, December 1, 1958, page 30.

FRED C. MATTERN, JR., *Primary Examiner.*

BROUGHTON G. DURHAM, *Examiner.*

J. A. MARSHALL, *Assistant Examiner.*

UNITED STATES PATENT OFFICE
CERTIFICATE OF CORRECTION

Patent No. 3,279,281                                          October 18, 1966

Carl P. Anderson et al.

It is hereby certified that error appears in the above numbered patent requiring correction and that the said Letters Patent should read as corrected below.

Column 3, line 68, for "within" read -- with --; column 4, line 75, after "pin" insert -- 20 --; column 5, lines 16 and 17, strike out "The follower is preferably a releasable" column 12, line 17, strike out "device", second occurrence.

Signed and sealed this 5th day of September 1967.

(SEAL)
Attest:

ERNEST W. SWIDER                                        EDWARD J. BRENNER
Attesting Officer                                            Commissioner of Patents